United States Patent [19]

Hallden-Abberton et al.

[11] Patent Number: 5,362,809
[45] Date of Patent: Nov. 8, 1994

[54] POLYMER BLENDS OF POLYGLUTARIMIDES

[75] Inventors: Michael P. Hallden-Abberton, Maple Glen; Newman M. Bortnick, Oreland; William J. Work, Huntington Valley, all of Pa.

[73] Assignee: Rohm and Haas Company

[21] Appl. No.: 964,740

[22] Filed: Oct. 22, 1992

[51] Int. Cl.$^5$ ............................................. C08L 33/06
[52] U.S. Cl. .................................. 525/132; 525/133; 525/148; 525/176
[58] Field of Search ......................................... 525/132

[56] References Cited

U.S. PATENT DOCUMENTS

| | | |
|---|---|---|
| Re. 26,065 | 7/1966 | Marvel et al. . |
| 3,174,947 | 3/1965 | Marvel et al. . |
| 3,509,108 | 4/1970 | Prince . |
| 3,549,603 | 12/1970 | Chemevy . |
| 3,551,389 | 12/1970 | Prince . |
| 4,246,374 | 1/1981 | Kopchik . |
| 4,433,083 | 2/1984 | Cogswell ............... 525/444 |
| 4,727,117 | 2/1988 | Hallden-Abberton et al. . |
| 4,828,699 | 5/1989 | Soehngen . |
| 5,124,403 | 6/1992 | Sasaki et al. ............ 525/67 |

FOREIGN PATENT DOCUMENTS 354407 7/1989 European Pat. Off. .

OTHER PUBLICATIONS

WO 93-12178 (Hoechst Celanese)—abstract only.
D. Shyang Chem et al., Journal of Applied Polymer Science, vol. 36, 141-163 (1988) Binders for Higher-Solids Coatings. IV. Liquid-Crystaline Acrylic Lacquers.
J. Economy, Angew Chem. Int. Ed. Engl. 29 (1990) 1256-1261, Trends and Possibilities in Liquid Crystalline Polymers.
E. G. Joseph et al., Polymer Prep. Am. Chem. Soc. Div. Polym. Chem. 24, 304 (1983) Thermal and Structural Studies of Flexible and Semi-Rigid Polymeric Blends.
F. Paola La Mantia et al., Makromol. Chem., Macromol. Symp. 38, 183-193 (1990) Processing and Properties of Blends with Liquid Crystal Polymers.
A. Siegmann, et al., Polymer 1985, vol. 26, Aug., pp. 1325 1330, Polyblends Containing a Liquid Polymer.
Kanakalatha et al., Some Studies of Polyblends of Poly(p-phenyleneterephthalamide) and P. Nylon-6, Polymer, 1983, vol. 24, May, pp. 621-625.

*Primary Examiner*—Patricia A. Short
*Attorney, Agent, or Firm*—Roger K. Graham

[57] ABSTRACT

A polymer blend of a polyglutarimide and liquid crystalline copolyester polymer or benzimidazole polymer. The blend is a melt-compoundable polymer blend.

3 Claims, No Drawings

POLYMER BLENDS OF POLYGLUTARIMIDES

FIELD OF THE INVENTION

This invention relates to blends of thermoplastic polymers and which contain N-alkyl-glutarimide groups and liquid crystalline polymers or benzimidazole polymers.

BACKGROUND OF THE INVENTION

Polyglutarimides are acrylic-glutarimide copolymers containing units of the structure:

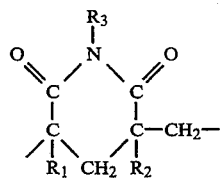

where $R_1$ and $R_2$ are H or methyl, and $R_3$ is hydrogen, alkyl, cycloalkyl, substituted alkyl, substituted cycloalkyl, aryl, substituted aryl, alkaryl, substituted alkaryl, aralkyl, substituted aralkyl, or heterocyclic. Polyglutarimides (especially those polyglutarimides where $R_1$ and $R_2$ are $CH_3$ and $R_3$ is H or methyl), are useful thermoplastics, exhibiting thermal stability, moldability, clarity, low color, reasonable toughness, and good barrier properties. It has further been known that such polyglutarimides, especially those where acid or anhydride groups present in the polyglutarimide are reacted with an alkylating or esterifying agent to reduce the acid/anhydride content to levels of about 0.5 weight percent or less, are compatible with a broad variety of thermoplastics, as well as serving as compatibilizers for blends of many polar polymers. Polyglutarimides, sometimes hereinafter referred to as imides or PGI, are prepared by imidizing acrylic polymers. See U.S. Pat. No. 4,727,117 for one method of preparing PGI's having acid and anhydride content lower than those prepared by U.S. Pat. No. 4,246,374. The disclosures of both U.S. Pat. No. 4,246,374 and U.S. Pat. No. 4,727,117 are incorporated by reference herein. From time to time in this specification, the phrase "capped imides" or "capped PGI's" will refer to those imides made by the process described in U.S. Pat. No. 4,727,117.

It is known that PGI's can be blended with a wide variety of other polymeric materials. For example, see TABLE XVII and XX, column 34 and 35 in U.S. Pat. No. 4,727,117 where PGI's are blended in a series 50/50 weight blends with many thermoplastic blends including some polyesters that may or may not be considered semi-crystalline, (i.e. PETG). Among the polar polymers are included polyesters, especially aromatic polyesters, by which is meant the polymer formed by condensation of an aliphatic glycol with an aromatic acid, such as ethylene glycol with terephthalic acid, commonly known as poly(ethylene terephthalate) (PET), or butylene glycol with terephthalic acid also known as poly(butylene terephthalate) (PBT), and the like.

Liquid crystalline (LC) polyesters are typically made from monomers of aromatic diols, aromatic diacids and aromatic hydroxy acids and other monomers having ring structures capable of giving a stiff chain with high axial aspect ratio. Aromatic diols and the like are represented by:

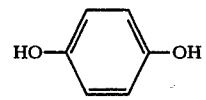
1)

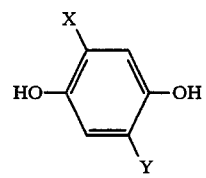
2)

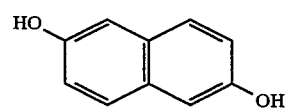
3)

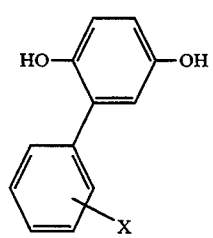
4)

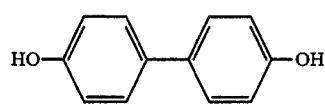
5)

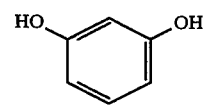
6)

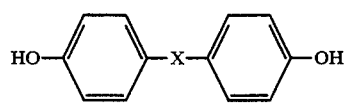
7)

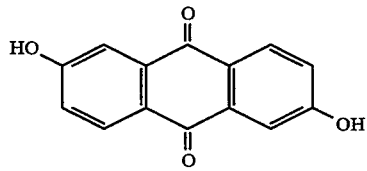
8)

The aromatic diacids and the like are represented by:

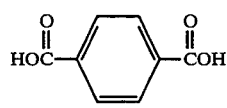
1)

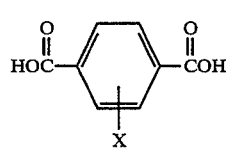
2)

-continued

3) 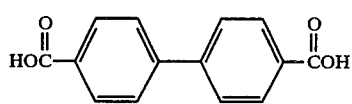

4) 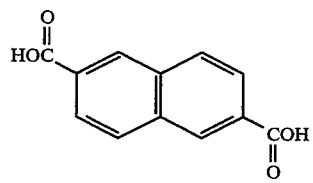

5) 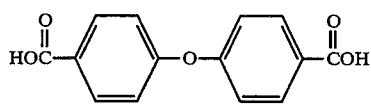

6) 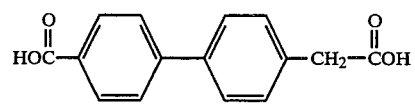

7) 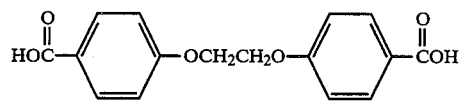

8) 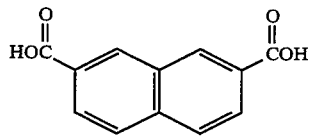

9) 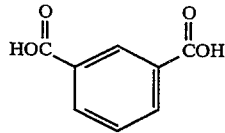

The aromatic hydroxyacids and the like are represented by:

1) 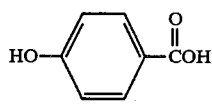

2) 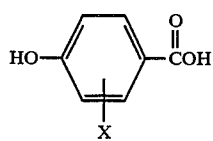

3) 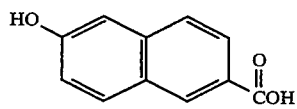

4) 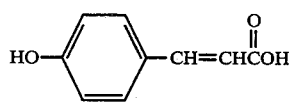

-continued

5) 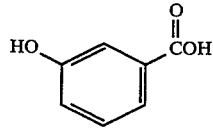

6) 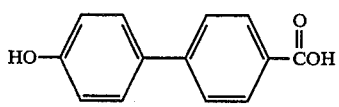

Hydroxyacetamides are represented by

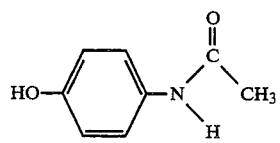

In some of the above formulas, X and Y may represent hydrogen, halo, sulfur and lower alkyls of up to about 4 carbon atoms.

Another polymer that can be blended with the polyglutarimide polymers include the benzimidazoles (BI).

The polybenzimidazoles (PBI) consist essentially of recurring units of the following Formulas I and II.

Formula I is:

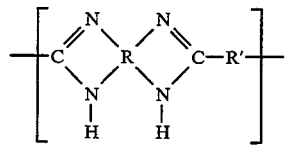 (I)

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

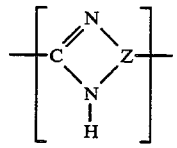 (II)

wherein Z in an aromatic nucleus having the nitrogen atoms forming the benzimidazole ring paired upon adjacent carbon atoms of the aromatic nucleus.

Preferably, aromatic polybenzimidazoles (PBI) are selected from polymers consisting essentially of the recurring units of Formulas I and II wherein R' is an aromatic ring or a heterocyclic ring.

U.S. Pat. No. 3,174,947 and Re. U.S. Pat. No. 26,065, teach that the aromatic polybenzimidazoles having the recurring units of Formula II are prepared by selfcondensing a trifunctional aromatic compound containing only a single set of ortho-disposed diamino substituents and an aromatic, preferably phenyl, carboxylate ester substituent. Exemplary of polymers of this type is poly-2,5(6)-benzimidazole prepared by the auto-condensation of phenyl 3,4-diaminobenzoate.

As set forth in the above-mentioned patents, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the diphenyl ester of an aromatic dicarboxylic acid, (b) the diphenyl ester of a heterocylic dicarboxylic acid wherein the carboxyl groups are substitutents upon a carbon in a ring compound selected from the class consisting of pyridine, pyrazine, furan, quinoline, thiophene and pyran and (c) an anhydride of an aromatic dicarboxylic acid.

The liquid crystalline polyesters (LCP) within the scope of this invention are those polymers usually involving a succession of para-oriented ring structures to give a stiff chain with high axial aspect ratio (ratio of length of molecule to its width. Liquid crystalline polyesters (LCP) or copolyesters (LCP) used in the blends of this invention may also contain "spacer" groups to interlink the low molecular weight monomers. The spacer groups may be, for example $-(CH_2)_n-$. Other spacer units include the following:

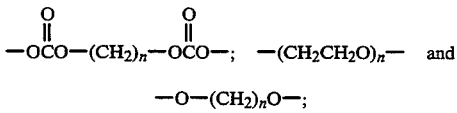

and various combinations thereof where n may be from 1 to 16.

The LCP field has expanded rapidly in the last few years with the development of various copolymers of 6-hydroxy-2-naphthoic acid (HNA), 4-aminophenol, and terephthalic acid. Liquid crystal (LC) domains form stiff rodlike molecular alignment that occurs in a preferred direction along their long axes. The synthetic aramids such as poly(1,4-benzamide) (PBA) and polyazomethines set the stage for developing blends with other melt processable thermoplastics. It is believed liquid crystalline nature is the consequence of molecular symmetry shape and chain stiffness.

These repeating units for LCP can be found in such well recognized products as VECTRA®, KEVLAR®, XYDAR® and others. The LCP's will increase the tensile strength, heat resistance distortion improvement and other properties when blended with the polyglutarimides (PGI) in relatively small amount. When the LCP's are blended with PGI lower viscosities than the pure imides result. Therefore, the processing of these blends will be relatively easy by injection molding. Other improved properties may include enhanced flame retardance, lower coefficient of linear thermal expansion, and greater chemical resistance to solvents. Such PGI/LCP blends as described and claimed herein will find use in many different applications such as compatibilizing agents, modified thermoplastics and impact modified thermoplastics, toughening agents, tie layers in multilayer coatings, processing aids, adhesives, coatings, oriented films, such as biaxially oriented blown films and engineering thermoplastics.

DETAILED DESCRIPTION OF THE INVENTION

The polyglutarimides useful in this invention may be the PGI's produced as described in U.S. Pat. No. 4,246,374 or the capped PGI's produced as described in U.S. Pat. No. 4,727,117. The polyglutarimides which form polymer blends include, but should not be limited to, the imidized acrylic polymers disclosed in these U.S. patents. These imidized acrylic polymers are formed by the reaction between an acrylic polymer containing units derived from esters of acrylic or methacrylic acid and ammonia or primary amines. The imidized acrylic polymers contains glutarimide units of the formula

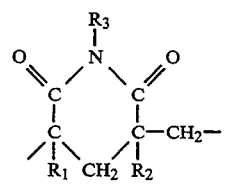

where $R_1$, $R_2$, and $R_3$, independently, represent hydrogen or unsubstituted or substituted $C_1$ to $C_{20}$ alkyl, aryl, aralkyl, alkaryl or mixtures there thereof, are referred to herein as polyglutarimides. Polyglutarimides formed from ammonia are referred to herein as ammonia imides and polyglutarimides formed from mono methylamine are referred to herein as methyl imides. The Vicat softening point of polyglutarimides as determined by ASTM DI 525-70, measured in degrees Centigrade. The Vicat softening point, which is a measurement of the maximum service temperature of polyglutarimides ranges from about 125° C. to about 220° C.

The polyglutarimides should contain at least about 1.0% up to 100% by weight of glutarimide units and may be prepared by solution, emulsion, and autoclave processes as well as by melt reaction processes. The polyglutarimides of this invention may include other comonomers, such as styrene, in concentrations of up to and including about 95 percent by weight. The polyglutarimides are non-crosslinked, soluble in dimethylformamide and are thermally stable. The blends of this invention may also be modified by the incorporation of additives, such as pigments, fillers, stabilizers, flame retardants, lubricants, glass fibers impact modifiers and the like.

The capped PGI's (see U.S. Pat. No. 4,727,117) included in the blends of this invention will contain glutarimide units wherein the degree of imidization by weight, on said polymer is from about 1% to about 95%.

The liquid crystalline copolyesters (LCP) employed are crystalline having the repeating units as exemplified above. The preferred LCP will be formed from various combinations of such monomers as 6-hydroxy-2-naphthoic acid (HNA), terephthalic acid, 4-hydroxyacetanilide, p-hydroxybenzoic acid (HBA), 4-aminophenol, etc.

The liquid crystalline polymers used in the examples hereinafter include VECTRA® B-950, a copolyester/amide believed to be a combination of various monomer mole quantities of 6-hydroxy-2-napthoic acid (HNA), terephthalic acid, and p-hydroxyacetanilide. Such a monomer mixture to produce VECTRA® B-950 is believed to contain up to about 58 mole % HNA, up to about 21 mole % terephthalic acid, and up to about 21 mole % p-hydroxyacetanilide. VECTRA® A-950 is believed to be made from various mole fractions of about 73% p-hydroxybenzoic acid and 27%, 6-hydroxy-2-naphthoic acid.

Other polyesters and polycarbonate esters (other than wholly aromatic LCP polyesters) such as PET, PBT or PC, may be employed as a part of the blend with the LCP and PGI. These preferred polyesters are polyesters formed predominately of units derived from ethylene or 1,4-butylene glycol and terephthalic acid. The ratio of polyester to PGI maybe from about 1:10 to 10:1, preferably 1:4 to 4:1. Independantly, the ratio of Imide to LCP may be from about 1:20 to 20:1, preferably 1:8 to 8:1.

The commercially available LCP resins are supplied in pellet form. The commercially available PGI resins are also available in pellet or powder form.

A preferred melt or compoundable processable LCP forming a thermotropic melt phase at a temperature below approximately 350° C. which is particularly suited for molding applications consists of the recurring moieties (1) p-oxybenzoyl moiety, (2) 2,6-dicarboxynaphthalene moiety and (3) symmetrical dioxyaryl moiety wherein the respective chemical structures are:

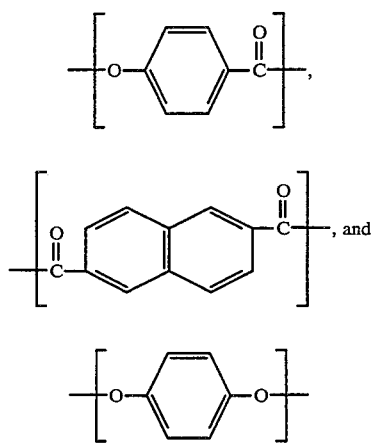

A particularly preferred wholly aromatic polyester comprises approximately 50 to 70 mole percent of moiety (1) (e.g., approximately 60 mole percent), approximately 15 to 25 mole percent of moiety (2) (e.g., approximately 20 mole percent) and approximately 15 to 25 mole percent by moiety (3) (e.g., approximately 20 mole percent).

Other ester-forming moieties (e.g., dicarboxy or dioxy units) other than those previously discussed which are free of ring-substitution additionally may be included in the wholly aromatic polyester in a minor concentration so long as such moieties do not adversely influence the desired thermotropic melt phase exhibited by the polyester. As will be apparent to those skilled in the art, the total molar quantities of dicarboxy units and dioxy units present within the wholly aromatic polyester will be substantially equal. The various moieties upon polymer formation will tend to be present in a random configuration.

The wholly aromatic polyesters commonly exhibit end groups, depending upon the synthesis route selected.

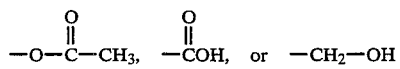

As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

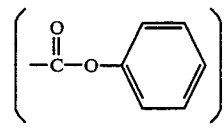

and methylester

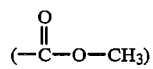

optionally may be included at the end of the polymer chains.

The wholly aromatic polyesters tend to be substantially insoluble in all common polyester solvents, such as hexafluoroisopropanol and o-chlorophenol, and accordingly are not susceptible to solution processing. They can surprisingly be readily processed by common melt processing techniques. Some solubility is discernable in pentafluorophenol.

The wholly aromatic polyesters commonly exhibit a weight average molecular weight of about 2,000 to 200,000, and preferably about 10,000 to 25,000 e.g., about 20,000 to 22,000. Such molecular weight may be determined by standard techniques not involving the dissolution of the polymer, e.g., by end group determination via infrared spectroscopy on compression molded films.

The wholly aromatic polyesters are considered crystalline in the sense that fibers melt extruded therefrom exhibit X-ray diffraction patterns, using Ni-filtered CuKa radiation and flat plate camera, characteristic of polymeric crystalline materials. In spite of the crystallinity observed, the wholly aromatic polyesters nevertheless may be easily melt processed.

The wholly aromatic polyesters are not intractable and form a thermotropic melt phase whereby an atypical degree of order is manifest in the molten polymer. The polyester readily forms axial or two dimensional liquid crystals in the melt phase and accordingly exhibits a high tendency for the polymer chains to orient in the shear direction. Such thermotropic properties are manifest at a temperature which is amenable for melt processing or melt compounding to form shaped articles.

The wholly aromatic polyester may be formed by a variety of ester-forming techniques whereby organic monomer compounds possessing functional groups which upon condensation form the requisite recurring moieties are reacted.

The organic monomer reactants from which the p-oxybenzoyl moiety (i.e., moiety (1) and the symmetrical dioxy aryl moiety (e.i., moiety (3)) are derived are initially provided in a modified form whereby the usual hydroxyl groups of these monomers are esterified (i.e., they are provided as acyl esters). For instance, lower acyl esters of p-hydroxybenzoic acid wherein the hydroxy group is esterified and lower acyl diesters of an aryl diol may be provided as reactants. The lower acyl groups preferably have from 2 to about 4 carbon atoms. Preferably the acetate esters of the organic compounds which form moieties (1) and (3) are provided. Accordingly, particularly preferred reactants for condensation with 2,6-naphthalene dicarboxylic acid are p-acetoxybenzoic acid and hydroquinone diacetate. If minor quantities of other reactants which provide oxy and/or amine units within the resulting polymer optionally are provided, these too are preferably provided as the corresponding lower acyl esters or amides.

In a preferred slurry polymerization technique the reactants (e.g., p-acetoxybenzoic acid, 2,6-naphthalene dicarboxylic acid, and hydroquinone diacetate) are provided in an inert heat exchange medium which preferably serves as a solvent for at least one of the reactants. Typically, the 2,6-naphthalene dicarboxylic acid reactant is substantially insoluble in the inert heat exchange medium and is present therein as a finely divided solid. As the polymer forms, it is insoluble in the inert heat exchange medium and assumes the configuration of a fine powder.

Molded shaped articles formed from PGI/LCP or PBI blends of the present invention generally exhibit a superior tensile strength, flex strength, and impact strength when compared with blends of the prior art. Also, the appearance of the resulting molded articles generally is superior with the resulting molded articles commonly exhibiting a light opaque tan color and an attractive smooth surface. The shaped articles may be utilized for extended periods of time at relatively high temperatures (e.g., 130° to 200° C.) without being adversely influenced, and exhibit an inherent resistance to burning.

SUMMARY OF INVENTION

We have discovered that a blend of polyglutarimide polymers (PGI) and liquid crystalline copolyester polymers (LCP) or benzimidazole (PBI) polymers form blends having high degrees of tensile reinforcement with relatively small amounts of LCP. The blends are an attractive opaque creamy tan or chocolate color. The viscosity of the blends are lower than the viscosity of PGI providing a means to make blends with very high heat resistance and a combination of relatively high tensile strength and modulus that can be used in injection molding equipment.

The PGI/LCP or PBI blends consisting essentially of (A) about 1 to 99 parts by weight of PGI and (B) about 1 to 99 parts by weight of a LCP or PBI. The poly(glutarimide) (PGI) refers to a polymer which contains at least about 5 weight percent, preferably more than about 50 weight percent, and more preferably up to about 95 weight percent, or mers of the cyclic, structure N-alkylglutarimide, N-cycloalkylglutarimide, or N-hydrogenglutarimide, where alkyl refers to alkyl groups containing one to eight carbon atoms and cycloalkyl groups containing three to eight carbon atoms.

Other polymers than LCP or PBI may be included in the blend; for example, PET or polycarbonate may be included into either blend.

The LCP, preferably a liquid crystalline polyester, copolyester, or copolyesteramide, containing monomeric units (mesogenic units) as discussed above feature polymer with asymmetry of molecular shape manifested either as rods characterized by a uniaxial order with an axial ratio greater than three or by thin platelets with biaxial order. The ordered structures of liquid crystalline materials are dominated by intermolecular interactions. Such ordered and rigid structure of LCP or BPI's enhance the properties of the blends with PGI polymers.

The polyblends of the imidized acrylic polymer (PGI) and the LCP or PBI polymers are recognized as thermoplastic/thermotropic blends having unique mechanical properties. The rheology of such blends system has an important bearing on the behavior of blends when melted and used for molding and other forming operations. Low shrinkage of finished products of polymer blends containing LCP or PBI polymers can be expected.

The LCP materials described consist of recurring units p-oxybenzoyl moiety, 2,6-dioxynaphthalene moiety, and terephthaloyl moiety and may be free of units which possess ring substitution. The LCP with these recurring units are made as described in U.S. Pat. No. 4,184,996. Other moieties may include units from a dioxyphenyl moiety and other aromatic containing carbocyclic dicarboxyl moiety. See U.S. Pat. Nos. 4,355,132 and 4,351,917.

The poly(glutarimide) and LCP or BPI polymer may be blended in a ratio of from about 1:20 to about 20:1 poly(glutarimide):LCP or PBI. A preferred range for this ratio is from about 1:10 to about 10:1, and a more preferred range is from about 1:8 to about 8:1. A preferred temperature range where the polymers are melted and blended together is from about 240° C. to about 420° C. A more preferred temperature range for achieving blending in a time commensurate with reasonable processing speed is from about 260° C. to about 360° C.

Polybenzimidazoles (PBI) (such as discussed in U.S. Pat. No. 4,828,699) useful within the scope of this invention have the recurring structure of Formula I or Formula II (above) are as follows:

poly-2,2'-(m-phenylene)-5,5'-bibenzimidazole;
poly-2,2'-(pyridylene-3",5")-5,5'-bibenzimidazole;
poly-3,3'-(furylene-2",5")-5,5'-bibenzimidazole;
poly-2,2'-(naphthalene-1',6')-5,5'-bibenzimidazole;
poly-2,2'-(biphenylene-4',4')-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexenyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) sulfone;
poly-2,2'-(m-phenylene)-5,5'-di(benzimidazole) methane;
poly-2,2'-(m-phenylene)-5,5'-di(benzimidazole) propane-2,2; and
poly-2',2"-(m-phenylene)-5',5"-di(benzimidazole)ethylene-1,2 where the double bonds of the ethylene groups are intact in the final polymer.

The preferred polybenzimidazole is prepared from poly-2,2'-(m-phenylene)-5,5'-bibenzimidazole, the recurring unit of which is:

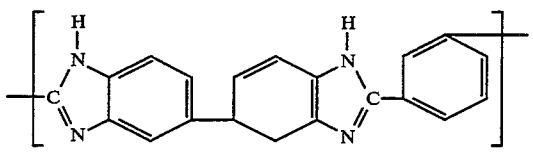

Any polymerization process known to those skilled in the art may be employed to prepare the polybenzimidazole. Representative techniques for preparing these PBI's are taught in U.S. Pat. Nos. 3,509,108, 3,549,603, and 3,551,389.

In a preferred process, the pelletized polymers, PGI/LCP or PBI polymers, are compounded together in a devolatilizing extruder. In another preferred process the the poly(glutarimide) and LCP or BPI are dispersed in a solvent, either separately and subsequently mixed, or they are dispersed together; the dispersion is heated to the temperatures, and agitated for a length of time after which the solvent is removed. A preferred method for removing the solvent is to pass the solution through a devolatilizing extruder.

Where solvents are used in the process the solvents are preferably selected to dissolve or swell at least one of the polymers. Typical solvents include $C_1$–$C_{18}$ aliphatic alcohols such as methyl, ethyl, isopropyl, butyl, hexyl, cyclohexyl and octyl alcohols, aromatic alcohols such as cresol, aromatic hydrocarbons such as benzene, toluene, xylene and pentafluorophenol, ethers such as glyme, diglyme and higher glymes, dioxane and tetrahydrofuran, other solvents such as dimethylformamide, dimethyl sulfoxide and dimethylacetamide, and mixtures of these solvents. Other suitable solvents will readily occur to those skilled in the art.

The individual polymeric components may be blended together by mixing the polymer powders and pellets, such as by tumbling, drum mixing, and the like, or they may be compounded as a melt using such equipment as mill rolls. Appropriate methods of blending the components will be apparent to those skilled in the art.

The blend thus formed is prepared by compounding the components, blending them in the melt and removing any water and/or solvent liberated during the melting. A single- or twin-screw extruder is preferred for this operation, but other appropriate equipment will be apparent to those skilled in the art. The polymer blend may be pelletized for later processing, or it may be fed in molten form directly to a separate zone suitable for molding, blowing into film form, or foaming into sheet. If twin-screw extruders are used, they may be counter- or co-rotating. The screws may be tangential or intermeshed. The extruder is preferably equipped with one or more devolatilizing vents, and it is further preferred to apply vacuum at that vent to remove water/solvent. The temperature of melt processing may be from about 250° C. (if all components are molten or dispersed at that temperature) to about 420° C. Although the blending may be conducted outside that range for certain LCP OR PBI and poly(glutarimides), more preferred is from about 260° C. to about 360° C.

The polymer blend of the present invention may be formed, as by molding or extruding into many useful objects such as automotive parts, computer housings, appliance housings, films, sheet, foamed sheet, and the like. The blend is especially useful in producing molded articles, such as bottles, fuel tanks, automotive bumpers, automotive body panels, electrical connectors, printed circuit boards, housing for electrical components and the like, which cannot be readily prepared with desired properties. These objects have a useful balance of toughness, tensile modulus, and heat distortion temperature. Such articles may be made by either injection or compression molding, extrusion blow molding, blow molding, or other thermoforming processes. Other uses for the polymer blend include heat-resistant and solvent-resistant engineering thermoplastics, electrical insulators etc. They may be processed into complex parts by other known plastics processing technique, and can be painted, dyed, decorated, metallized, or coated with abrasion resistant coatings. Also flame retardants may be used and or glass fiber reinforcement may made part of the polymer blend.

The following non-limiting examples are presented as specific illustrations of the claimed invention. All polyglutarimides in the following examples contains N-methyl dimethylglutarimide units, wherein $R_1$, $R_2$, and $R_3$ are methyl groups. It should be understood, however, that the invention is not limited to specific details set forth in the examples. All parts and percentages are by weight unless otherwise indicated. The following abbreviations are used:

LCP-A—liquid crystalline copolyesters (Vectra® A-950) of a poly(p-hydroxybenzoic acid-co-6-hydroxy-2-naphthoic acid.

LCP-B—liquid crystalline copolyester (Vectra® B-950) of a poly(terephthalic acid-co-p-aminophenol-co-6-hydroxy-2-naphthoic acid).

PGI-1 Uncapped, Vicat 170° C. 87% Imidized

PGI-2 Uncapped, Vicat 150° C. 73% Imidized

PGI-3 Capped, Vicat 160° C. 87% Imidized

PGI-4 Capped, Vicat 140° C. 73% Imidized

HDT 264/66 (ASTM D648)—Heat deflection temperatures at 264 and 66 pounds per square inch VICAT (ASTM D 1525)—Temperature in degrees centigrade at which the needle penetrates the specimen 1 mm Tens. Str. (ASTM D638)—Tensile strength in pounds per square inch Tens. Str. (ASTM D638)—Tensile elongation to break Y/B—Yield strength divided by break strength Tens. Mod. (ASTM D638)—Tensile modulus Pa—Pascals, newtons per square meter KPa—thousand of pascals MPa—million of pascals N—newtons Polyglutarimide/LCP blends were prepared on two different extruders. Some samples were extruded on the 0.8" W.E. twin screw, non-intermeshing, counter-rotating extruder at 300° C. set temperature, using the conditions shown below. Other samples were extruded on the 1.0" Killion, single screw (two stage, vented) extruder at 300° C. set temperature, using the a feed rate of 58–84 g/min and a screw speed of 100 RPM.

In the examples LCP-B, a poly(terephthalic acid-co-p-aminophenol-co-6-hydroxy-2-naphthoic acid), liquid crystalline polymer, obtained from Celanese Specialty Operations, Summit, N.J., was fed separately, along with polyglutarimide, into the feed throat of the extruder. LCP-A, a poly(p-hydroxybenzoic acid-co-6-hydroxy-2-naphthoic acid) liquid crystalline polymer, also obtained from Celanese Specialty Operations, was used in place of the LCP-B sample in one run. Both extruders were operated under full vacuum.

A typical condition for samples prepared on the 0.8" W.E. extruder:

| | |
|---|---|
| Set Temp: | 300° C. |
| Screw Speed: | 500 RPM |
| PGI Feed Rate: | 65.0 g/m (80.0%) |
| LCP-B Feed Rate: | 16.25 g/m (20.0%) |
| Total Feed: | 81.25 g/m |

Also, PGI and LCP-B were coextruded in the 0.8" W.E. line at 300 PRM and 40 g/min feed rate with 0-10 g/min added LCP-B at 300° C. barrel temperature. In this run it was observed that the initial extruder torque readings decreased upon addition of the LCP-B. A set temperature of 300° C. was chosen because it is just above the melting point temperature which should allow fully thermotropic mixing. The decrease in torque is presumably due to the orientation effects of shear on the LCP melt phase. The blend processed smoothly, with no hint of stability problems, giving rise to an opaque, creamy tan strand of blended polymeric materials.

TABLE 1, EXAMPLES 1 TO 6

TABLE 1

| | | Examples 1 to 6 | | | |
|---|---|---|---|---|---|
| Example No. | Feed Rate Imide (g/min) | Sample Composition (% PGI/ % LCP) | Screw Speed (RPM) | Extruder Torque (Newtons) | Melt Temp. (°C.) |
| 1* | 40.0/0.0 | 100.0/0.0 | 300 | 1110 | 337 |
| 2 | 40.0/2.2 | 94.8/5.2 | 300 | 1110 | 330 |
| 3 | 40.0/4.6 | 89.7/10.3 | 300 | 800 | 331 |
| 4 | 40.0/10.0 | 84.9/15.1 | 300 | 800 | 325 |
| 5 | 40.0/10.0 | 80.0/20.0 | 300 | 733 | 323 |
| 6 | 65.0/16.3 | 80.0/20.0 | 500 | 1020 | 341 |

*Control

As LCP-B level increased to about 20% there was a continued decrease in torque (melt viscosity). After sample 5 was collected, the screw speed and feed rate were increased to 500 rpm and 65 g/min (PGI) in order to increase throughput rate.

Pelletized samples were dried overnight at 75° C. in a forced air oven prior to molding on an Newbury injection molding machine. Typical molding conditions were using a flat barrel temperature profile of 480° F. (250° C.), and a mold temperature (symmetrical) of 250° F. (121° C. ). A cycle time of 3/15/25/50—Piston Forward Time/1st Stage Injection/Hold/Total Cycle Time was used, with a screw speed of 100 RPM, back pressure of 689-2756 KPa and a ⅛" cushion. These conditions typically gave injection pressures of 3445-5512 KPa.

All samples were submitted for physical property testing (notched and unnotched Izod, Dynatup, (falling dart-total energy) tensile strength and modulus, and DTUFL).

Table 1 summarizes all 0.8" WE-prepared samples, and Table 2 summarizes 1.0" Killion-prepared samples. The Killion mixtures were preweighed, and bag mixed.

TABLE 2—EXAMPLES 7 TO 13

The polyglutarimide component in the polymer blend in this Example is an uncapped polyglutarimide produced according to U.S. Pat. No. 4,246,374 wherein about 87% of the polyacrylic polymer units are imidized and the polyglutarimide contained between about 7.3% nitrogen with a Vicat softening point of about 170° C. The LCP component of the polymer blend was a commercially available product identified as LCP-B. This product is believed to be synthesized from the following monomers: 6-hydroxy-2-naphthoic acid (58–62%); 4-aminophenol (18–22%); terephthalic acid (18–22%).

| Example No. | PGI-1/ LCP-B | Tens. Str. MPa | Tens. Elong to break % | Tens. Mod. KPSI | HDT@ 264/66 °C. |
|---|---|---|---|---|---|
| 7* | 100/0 | 85.3 | 4.41 | 3590 | 141/154 |
| 8 | 95/5 | 94.1 | 2.71 | 4440 | 155/167 |
| 9 | 90/10 | 116 | 2.48 | 5660 | 161/172 |
| 10 | 85/15 | 120 | 2.02 | 6760 | 165/173 |
| 11 | 80/20 | 109 | 1.74 | 6560 | 165/174 |
| 12 | 75/25 | 845 | 1.14 | 7210 | 165/173 |
| 13 | 70/30 | 91.4 | 1.05 | 9210 | 165/174 |

*Control

Table 2 shows the increase in tensile strength, modulus, and heat resistance vs. LCP content. As these samples become more reinforced, they also become less ductile, leading to lower % elongations and slightly lower impact.

Note that there is both a strong response and a maximum in the values at about 15% LCP. The 15% PGI/LCP sample represents a 41% increase in tensile strength over pure PGI.

TABLE 3

| | Examples 14 and 15 | | | |
|---|---|---|---|---|
| Example # | PGI-2/ LCP-B | Tens. Str. MPa | Tens. Elong. to Break | Tens. Mod. MPa | HDT@ 264/66 |
| 14 PGI-2 | 100/0 | 84.1 | 3.89 | 3340 | 123/144 |
| 15 | 80/20 | 142 | 2.21 | 7900 | 137/145 |

TABLE 4

| | Examples 16 and 17 | | | |
|---|---|---|---|---|
| Example # | PGI-3/ LCP-B | Tens. Str. MPa | Elong. to Break | Tens. Tens. Mod. MPa | HDT@ 264/66 |
| 16* PG1-3 | 100/0 | 89.3 | 5.95 | 3790 | 131/145 |
| 17 | 80/20 | 136 | 2.11 | 8430 | 146/156 |

TABLE 5

| | Examples 18 and 19 | | | |
|---|---|---|---|---|
| Example # | PGI-2/ LCP-B | Tens. Str. MPa | Elong. to Break | Tens. Mod. MPa | HDT@ 264/66 |
| 18* PGI-4 | 100/0 | 79.3 | 6.0 | 3590 | 121/135 |
| 19 | 80/20 | 100 | 1.78 | 7920 | 135/141 |

The polyglutarimide (PGI-3 and PGI-4) used in Tables 4 and 5 were capped PGI's made according to U.S. Pat. No. 4,727,117.

TABLE 6

| | Examples 20 and 21 | | | |
|---|---|---|---|---|
| Example # | PGI-1/ LCP-A | Tens. Str. MPa | Tens. Elong. to Break | Tens. Mod. MPa | HDT@ 264/66 |
| 20* PGI-1 | 100/0 | 85.3 | 4.41 | 3590 | 141/154 |
| 21 | 80/20 | 101 | 1.58 | 7810 | 150/162 |

EXAMPLE 22

In a similar manner to Example 17, a blend of a capped imide, PGI-3 (85%) and polybenzimidazole (15% Celazole® Hoechst Chem. Co.), was extruded (350°–360° C.) and molded to give a sample with increased heat resistance (264 psi DTUFL) over the PGI without polybenzimidazole.

We claim:

1. A composition comprising a blend of
    (a) a thermoplastic polyglutarimide copolymer containing units of the formula

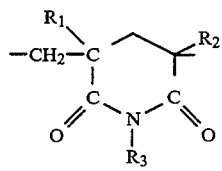

where $R_1$, $R_2$, and $R_3$ independently represent hydrogen or $C_1$ to $C_{20}$ unsubstituted or substituted alkyl, aryl, or mixtures thereof, and (b) liquid crystalline copolyesters containing monomeric units selected from aromatic diols, aromatic diacids, aromatic hydroxy acids, aromatic amino phenoxy groups, and mixtures thereof; wherein the liquid crystalline copolyester comprises a copolyester of 6-hydroxy-2-naphthoic acid, terephthalic acid and p-hydroxyacetanilide, wherein the polyglutarimide comprises from about 70 to about 99% of the blend, and wherein the tensile strength and heat distortion temperature of the blend exceed the tensile strength and heat distortion temperature of the polyglutarimide absent the liquid crystalline copolyester.

2. The composition of claim 1 wherein the copolyester contains between about 20 to about 80 mole percent 6-hydroxy-2-naphthoic acid, about 10 to about 40 mole percent terephthalic acid, and about 10 to about 40 mole percent p-hydroxyacetanilide.

3. The composition of claim 2 wherein the copolyester contains 58 mole % 6-hydroxy-2-naphthoic acid, 21 mole % terephthalic acid, and 21 mole % p-hydroxyacetanilide.

* * * * *